US012762892B2

(12) United States Patent
Lee et al.

(10) Patent No.: US 12,762,892 B2
(45) Date of Patent: Oct. 13, 2026

(54) APPARATUS FOR IDENTIFYING A FACE AND METHOD THEREOF

(71) Applicants: Hyundai Motor Company, Seoul (KR); Kia Corporation, Seoul (KR)

(72) Inventors: Keon Ho Lee, Incheon (KR); Moon Sub Jin, Yongin-Si (KR); Kyu Sang Choi, Suwon-Si (KR); Hyeon Seok Jung, Suwon-Si (KR); Kyung Hwan Cho, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 302 days.

(21) Appl. No.: 18/233,448

(22) Filed: Aug. 14, 2023

(65) Prior Publication Data

US 2024/0203160 A1 Jun. 20, 2024

(30) Foreign Application Priority Data

Dec. 16, 2022 (KR) ........................ 10-2022-0177528

(51) Int. Cl.
*G06V 40/16* (2022.01)

(52) U.S. Cl.
CPC .......... *G06V 40/172* (2022.01); *G06V 40/161* (2022.01); *G06V 40/171* (2022.01)

(58) Field of Classification Search
CPC ... G06V 40/161; G06V 40/171; G06V 40/172
See application file for complete search history.

(56) References Cited

U.S. PATENT DOCUMENTS

| | | | |
|---|---|---|---|
| 9,489,567 | B2 | 11/2016 | Wang et al. |
| 9,779,285 | B2 | 10/2017 | McPhie et al. |
| 2020/0218794 | A1 | 7/2020 | Zheng et al. |
| 2021/0342580 | A1 | 11/2021 | Desai et al. |
| 2021/0350210 | A1 | 11/2021 | Gong et al. |
| 2021/0374468 | A1 | 12/2021 | Chandraker et al. |

FOREIGN PATENT DOCUMENTS

| | | | | |
|---|---|---|---|---|
| CN | 111932439 A | 11/2020 | | |
| JP | 2022508990 A * | 1/2022 | ......... | G06F 18/2193 |
| KR | 10-2022-0008242 A | 1/2022 | | |
| KR | 10-2022-0043842 A | 4/2022 | | |

OTHER PUBLICATIONS

A machine translated English version of document JP2022508990, 2021 (Year: 2021).*

(Continued)

*Primary Examiner* — Ruiping Li
(74) *Attorney, Agent, or Firm* — Banner & Witcoff, Ltd.

(57) ABSTRACT

The present disclosure relates to a face identification apparatus and a method thereof. An apparatus includes: a processor configured to detect face information from image data, to extract face features from the detected face information based on a face feature extraction model weight-lightened through a weight-lightening technique, and to compare the face features with a previously stored face database to identify a face according to similarity; and a storage configured to store data and algorithms driven by the processor, and to have the face database.

20 Claims, 16 Drawing Sheets

(56) References Cited

OTHER PUBLICATIONS

Martinez-Diaz et al , "Towards Accurate and Lightweight Masked Face Recognition: An Experimental Evaluation", 2021 (Year: 2021).*
Park et al, "Partially Occluded Facial Image Retrieval Based on a Similarity Measurement", 2015 (Year: 2015).*
He, Yang, et al., "Filter Pruning via Geometric Median for Deep Convolutional Neural Networks Acceleration," arXiv:1811.00250v3 [cs.CV.] Jul. 14, 2019, 10 pages.

* cited by examiner

Process of converting floating point (FP32) into integer (INT8) using Q function

| Pruning / Performance item | Existing re-identification model(FP32) | Pruning 40% + PTQ (INTB) application | Pruning 60% + PTQ (INTB) application | Pruning 80% + PTQ (INTB) application | Performance gain |
|---|---|---|---|---|---|
| Inference time(ms) | 32.78 | 6.46 | 5.63 | 3.16 | 90.36 ↓ |
| Network size(MB) | 261.2 | 75.89 | 47.47 | 18.9 | 92.76 ↓ |
| Accuracy at public dataset (CFP_FP) | 0.9863 | 0.9816 | 0.9699 | 0.9474 | 3.89 ↓ |

FIG.9

| | | $f_0$ | $f_1$ | ... | $f_{n'}$ | Total |
|---|---|---|---|---|---|---|
| DB | Person A | | 1 + weight 0.5 | | 1 + weight 0.7 | Number 2 + weight 1.2 = 3.2 |
| | Person B | 1 + weight 0.1 | | | | Number 1 + weight 0.1 = 1.1 |
| | Person C | | | | | 0 |
| | ... | | | | | 0 |

FIG.12

Same total score

| | | $f_0$ | $f_1$ | ... | $f_{n'}$ | Total |
|---|---|---|---|---|---|---|
| DB | Person A | | 1 + weight 0.5 | | 1 + weight 0.5 | Number 2 + weight 1 = 3 |
| | Person B | 1 + weight 2 | | | | Number 1 + weight 2 = 3 |
| | Person C | | | | | 0 |
| | ... | | | | | 0 |

FIG.13

APPARATUS FOR IDENTIFYING A FACE AND METHOD THEREOF

CROSS-REFERENCE TO RELATED APPLICATION

This application claims priority to and the benefit of Korean Patent Application No. 10-2022-0177528, filed in the Korean Intellectual Property Office on Dec. 16, 2022, the entire contents of which are incorporated herein by reference.

BACKGROUND

(a) Field

The present disclosure relates to a face identification apparatus and a method thereof, and more particularly, to a technique for identifying a face wearing a mask.

(b) Discussion of the Background

In addition to occupational groups that must wear a mask indoors, individuals wear masks more frequently due to various reasons (e.g., a pandemic, air pollution, etc.), so a face recognition model in a mask-wearing state is needed.

For recognizing a mask wearing face, it may be recognized by using a separate module that extracts eye parts, etc., but there is a problem that a recognition speed is lowered due to the additional module. Further, in learning and recognizing a face wearing a mask, significant time and cost is consumed as a database of faces wearing a mask need to be configured.

In recognizing a face wearing a mask, a possibility in which the quality of a detected face recognition result is not satisfactory is very high in a dynamic real-time service process, and thus even if the performance of a recognition model is excellent, there is a possibility of face misrecognition.

Moreover, face information contains sensitive personal information, and there is a problem in that a security issue may occur in the process of transmitting and receiving information for face recognition to an external server.

The above information disclosed in this Background section is only for enhancement of understanding of the background of the disclosure, and therefore, it may contain information that does not form the prior art that is already known to a person of ordinary skill in the art.

SUMMARY

The following summary presents a simplified summary of certain features. The summary is not an extensive overview and is not intended to identify key or critical elements.

The present disclosure has been made in an effort to provide a face identification apparatus and a method thereof, capable of accurately identifying a face wearing a mask at low cost and time without additional resources or additional database construction in an inference process.

The present disclosure has also been made in an effort to provide a face identification apparatus and a method thereof, capable of minimizing misrecognition even if quality of a face recognition result detected in a dynamic real-time service process is poor.

In addition, the present disclosure has been made in an effort to provide a face identification apparatus and a method thereof, capable of preventing a security incident due to transmission to an external server by identifying a face wearing a mask based on an edge environment.

The technical objects of the present disclosure are not limited to the objects mentioned above, and other technical objects not mentioned may be clearly understood by those skilled in the art from the description of the claims.

A face identification apparatus may comprise: a processor configured to: detect face information from image data; extract face features from the detected face information based on a face feature extraction model weight-lightened through a weight-lightening technique; compare the face features with face data of a previously stored face database; and identify, based on a face similarity result associated with a comparison of the face features and the face data, a face; and a storage configured to store data and algorithms driven by the processor, and to have the face database.

The processor may be configured to: extract a key point of the face from a learning database including learned face image data; extract a face angle based on the key point of the face; and rotate a mask image to match the face angle.

The processor may be configured to: generate a mask synthesis learning database including data obtained by learning a degree of similarity between a face image wearing a mask and a face image not wearing a mask.

The processor may be configured to: perform weight-lightening of the face feature extraction model using network pruning, a quantization technique, or both the network pruning and the quantization technique.

The processor may be configured to: detect a face area from the image data; track the face area; and assign a tracking identifier (ID) to the face area.

The processor may be configured to: detect a plurality of faces from the image data; track each of the plurality of faces; and assign a tracking identifier (ID) to each of the plurality of faces.

The processor may be configured to: extract a face angle associated with the tracking ID; and exclude, based on the face angle being equal to or greater than a threshold value, image data associated with the face angle.

The processor may be configured to: digitize a degree of blur of the face associated with the tracking ID; and exclude, based on the degree of blur being greater than or equal to a threshold value, image data associated with the degree of blur.

The processor may be configured to: align, using a face angle associated with the tracking ID, the face associated with the tracking ID in a uniform direction based on: the face angle associated with the tracking ID being less than a first threshold value; and a degree of blur of the face associated with the tracking ID being less than a second threshold value.

The processor may be configured to: extract the face features by using the face associated with the tracking ID aligned in the uniform direction as an input of the weight-lightened face feature extraction model.

The processor may be configured to: extract the face features by: repeatedly performing a process of extracting a plurality of face features using the weight-lightened face feature extraction model to determine n face features.

The processor may be configured to: compare the n face features with the face data of the face database to calculate a face similarity value; and determine whether the face similarity value is greater than a threshold value.

The processor may be configured to: determine, according to a comparison result between the face similarity value and the threshold value, a score associated with n face features;

and record the score in a voting table, wherein the voting table comprises scores associated with face features for at least one user identifier (ID).

The processor may be configured to: record, based on the face similarity value not satisfying a threshold value, a first value in a voting table comprising scores of face features for at least one user identifier (ID), and record, based on the face similarity value satisfying the threshold value, a second value in the voting table.

The processor may be configured to: determine whether all scores recorded in the voting table are correspond to a first value, and based on a determination that all scores recorded in the voting table correspond to the first value, determine that a face identification target associated with the detected face information is not a face registered in the face database.

The processor may be configured to: determine, based on a determination that at least one score recorded in the voting table is greater than the first value, whether to assign a weight to the scores recorded in the voting table.

The processor may be configured to: assign a higher weight to a face feature having a forward-facing face angle among the face features; and assign a lower weight to a face feature having a degree of blur greater than a threshold value associated with blurriness.

The processor may be configured to: calculate a total score for each user identifier (ID) by summing scores associated with face features for the respective user ID; and output information of a user ID having a highest total score among user IDs as an identification result.

The processor may be configured to: based on an identification of at least two user IDs having a same total score, output, as an identification result, a user ID, of the at least the two user IDs, having a smaller number of scores.

A face identification method may comprise: detecting, by a processor, face information from image data; extracting, by the processor, face features from the detected face information based on a face feature extraction model weight-lightened through a weight-lightening technique; comparing, by the processor, the extracted face features with face data of a previously stored face database; and identifying, based on a face similarity result associated with the comparing, a face.

The face identification method further comprise one or more features and/or operations described herein.

According to the present disclosure, it is possible to accurately identify a face wearing a mask at low cost and time without additional resources or additional database construction in an inference process.

According to the present disclosure, it is also possible to minimize misrecognition even if quality of a face recognition result detected in a dynamic real-time service process is poor.

In addition, according to the present disclosure, it is possible to prevent a security incident due to transmission to an external server by identifying a face wearing a mask based on an edge environment.

Furthermore, various effects that can be directly or indirectly identified through this document may be provided.

These and other features and advantages are described in greater detail below.

BRIEF DESCRIPTION OF THE DRAWINGS

FIG. 9 illustrates a view for describing example weight-lightening performance.

FIG. 12 and FIG. 13 each illustrate an example voting table.

DETAILED DESCRIPTION

Figure 1:
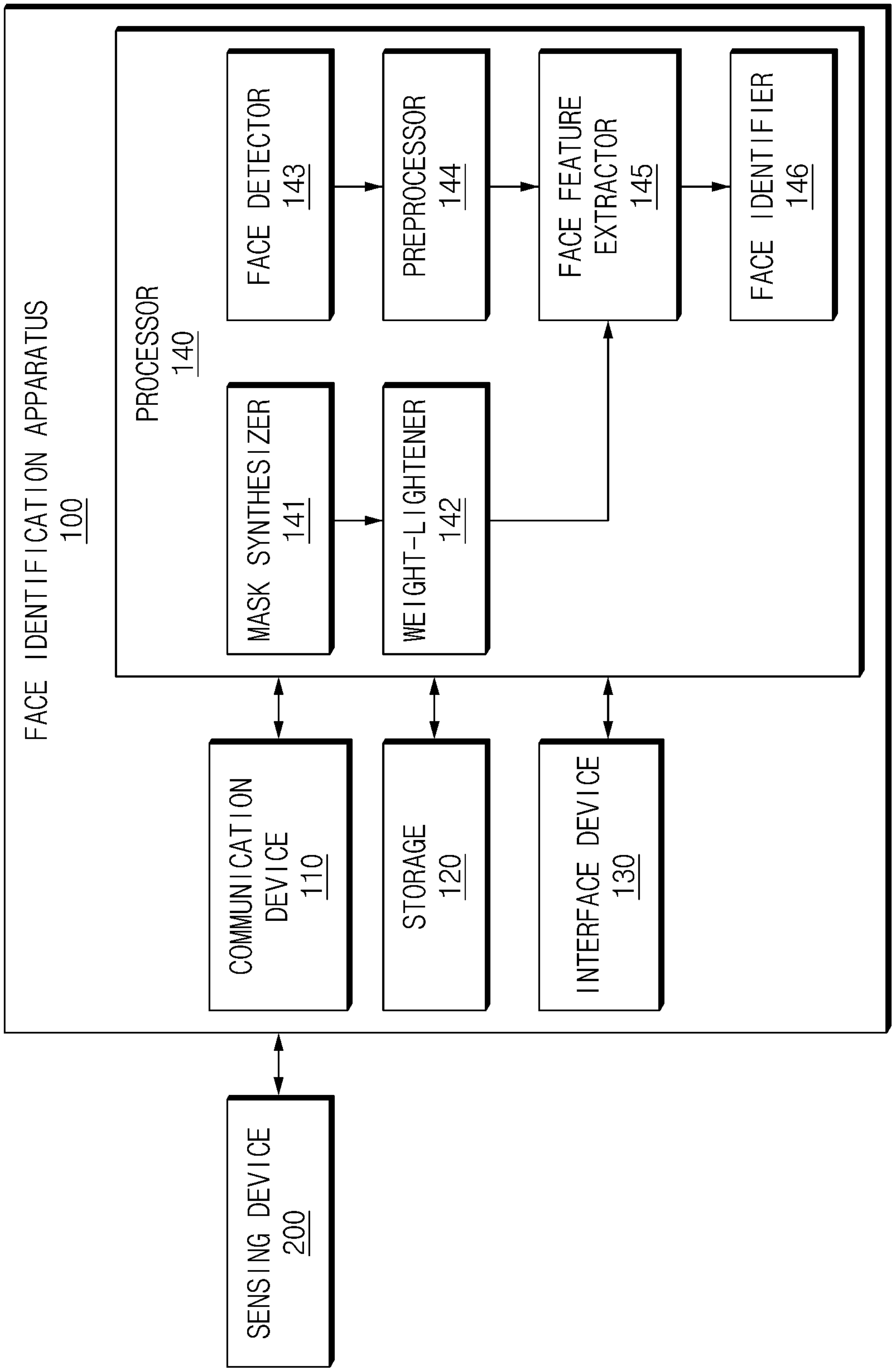
FIG. 1 illustrates a block diagram showing a configuration of an example face identification apparatus.

Hereinafter, various examples of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing various examples of the present disclosure, when it is determined that detailed descriptions of related well-known configurations or functions interfere with understanding of the gist of the present disclosure, the descriptions thereof may be omitted.

In describing constituent elements according to the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

The present disclosure discloses a technique capable of accurately identifying a face in an environment where face detection is not easy due to an edge computing environment and a dynamic environment that require real-time but have a performance limitation.

Hereinafter, various examples of the present disclosure will be described in detail with reference to FIG. 1 to FIG. 16.

Figure 2:
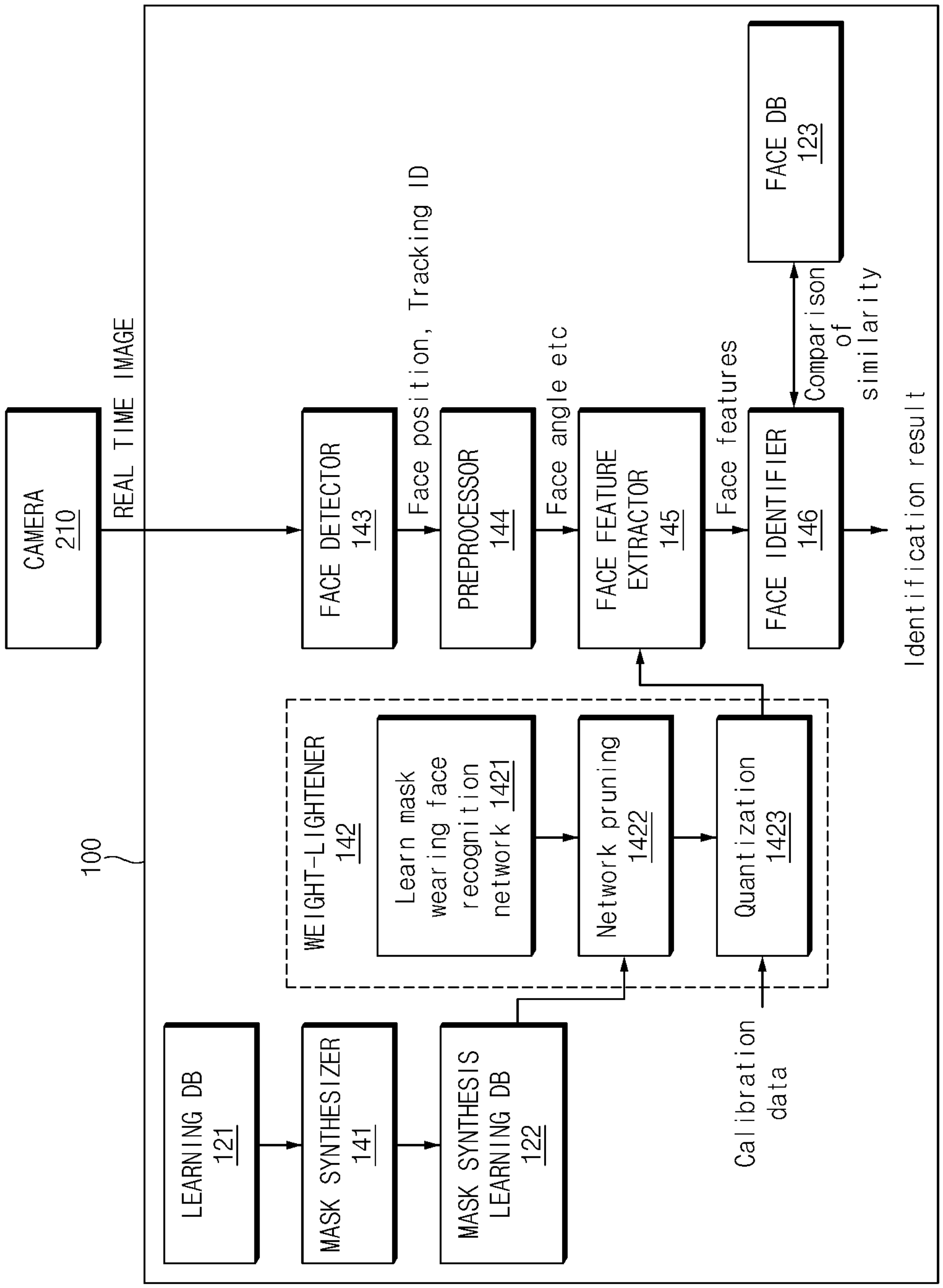
FIG. 2 illustrates a view for describing an example flow of a face identification process.

FIG. 1 illustrates a block diagram showing a configuration of an example face identification apparatus, and FIG. 2 illustrates a view for describing an example flow of a face identification process.

The face identification apparatus 100 may identify a user face from image data inputted through a sensing device 200.

To this end, the face identification apparatus 100 may be implemented inside or separately from a system requiring face identification (e.g., a vehicle, a robot, or the like). In this case, the face identification apparatus 100 may be integrally formed with internal control units of a system using the apparatus 100, and/or may be implemented as a separate hardware device to be connected to control units of the vehicle by a connection interface. For example, the face identification apparatus 100 may be implemented integrally with the system, and/or may be installed or attached as a separate element of the system.

Referring to FIG. 1, the face identification apparatus 100 may include a communication device 110, a storage 120, an interface device 130, and a processor 140.

The communication device 110 may include a hardware device implemented with various electronic circuits to transmit and receive signals through a wireless and/or wired connection, and may transmit and receive information based on in-system devices and network communication techniques. As an example, the network communication techniques may include controller area network (CAN) communication, local interconnect network (LIN) communication, flex-ray communication, and the like.

The communication device 110 may perform communication with an external server, infrastructure, other robots, etc. through a wireless Internet access and/or short range communication technique. Herein, the wireless communication technique may include wireless LAN (WLAN), wireless broadband (Wibro), Wi-Fi, world Interoperability for microwave access (Wimax), etc. The short-range communication technique may include Bluetooth, ZigBee, ultra-wideband (UWB), radio frequency identification (RFID), infrared data association (IrDA), and the like.

As an example, the communication device 110 may receive image data by communicating with the sensing device, 200 and may transmit face identification information identified by the processor 140 to another device.

The storage 120 may store sensing results of the sensing device 200 and data and/or algorithms required for the processor 140 to operate, and the like.

As an example, the storage 120 may store a learning DB 121, a mask synthesis learning DB 122, a face DB 123, a voting table (not shown), and the like, as illustrated in FIG. 2. The learning DB 121 may include learned data and algorithms based on a face not wearing a mask, sunglasses, etc. The mask synthesis learning DB 122 may include learning data and algorithms based on a face wearing a mask, sunglasses, etc. The face DB 123 may include face image data for each user. The voting table may include a score according to similarity of face features for each user ID, a weighted score, and a total sum thereof.

The storage 120 may include a storage medium of at least one type among memories of types such as a flash memory, a hard disk, a micro type, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, an optical disk, or the like.

The interface device 130 may include an input device for receiving a control command from a user and an output device for outputting an operation state of the apparatus 100 and results thereof. Herein, the input device may include a key button, a mouse, a joystick, a jog shuttle, a stylus pen, or the like. In some implementations, the input device may include a soft key implemented on the display.

The output device may include a display, and may also include a voice output device such as a speaker. In some implementations, if a touch sensor formed of a touch film, a touch sheet, or a touch pad is provided on the display, the display may operate as a touch screen, and may be implemented in a form in which an input device and an output device are integrated. In the present disclosure, the output device may display a face recognition result and a screen for face registration.

The display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be coupled (e.g., electrically connected) to the communication device 110, the storage 120, the interface device 130, and the like, may control each component, and may be an electrical circuit that executes software commands, thereby performing various data processing and calculations described below.

The processor 140 may process a signal transferred between components of the face identification apparatus 100 to perform overall control such that each component can perform its function normally. The processor 140 may be implemented in the form of hardware, software, or a combination of hardware and software. For example, the processor 140 may be implemented as a microprocessor, but aspects of the present disclosure are not limited thereto.

The processor 140 may detect face information from image data, may extract face features from the detected face information based on a face feature extraction model weight-lightened through a weight-lightening technique, and may compare the extracted face features with the previously stored face DB 123 to identify a face according to a degree of similarity.

The processor 140 may extract a key point of the face from a learning database including learned face image data, and may extract a face angle based on the key point of the face, rotate a mask image to match the face angle, and synthesize the face image and the rotated mask image. In this case, the key point of the face may include a jaw line, a nose, a mouth, and the like.

The processor 140 may generate a mask synthesis learning DB (database) 122 including data obtained by learning a high degree of similarity between a face image wearing a mask and a face image not wearing a mask.

The processor 140 may perform weight-lightening of the face feature extraction model using network pruning and/or a quantization technique. The pruning and the quantization technique will be described in detail later.

The processor 140 may detect a face area from image data, may track the face area, and may assign a tracking ID to the face area. The tracking ID may be matched with a user ID of the face DB 123 if the face is identified later. For example, the tracking ID may be displayed as a person A, a person B, and the like. The processor 140 may (e.g., simultaneously) detect a plurality of faces from the image data, may track each of the faces, and may assign a tracking ID to each face.

The processor 140 may extract a face angle for each tracking ID, and if the face angle is equal to or greater than a predetermined threshold value, may exclude image data corresponding to the tracking ID. The processor 140 may digitize a degree of blur of the face for each tracking ID. If the degree of blur is greater than or equal to a predetermined threshold value, the processor 140 may exclude image data corresponding to the tracking ID.

The processor 140 may extract the face angle of the face for each tracking ID and quantify the degree of blurring of the face for each tracking ID, and if the face angle is less than the predetermined threshold value and the degree of blur is less than the predetermined threshold value, the processor 140 may align the face for each tracking ID in a uniform direction based on the face angle. For example, the processor 140 may align the face angle to a front direction.

The processor 140 may extract face features by using a face for each tracking ID aligned in a uniform direction as an input of the weight-lightened face feature extraction model.

The processor 140 may extract N face features by repeatedly performing a process of extracting face features detecting face information from image data, N times.

The processor 140 may compare the N face features with data of a face database to calculate a similarity value, may determine whether a degree of similarity is greater than a predetermined threshold value, and may record scores in a voting table in which scores of face features for each user ID are written according to a comparison result between the similarity and the predetermined threshold value.

The processor 140 may record "0" in the voting table in which scores of face features for each user ID are written if the degree of similarity is equal to or less than a predetermined threshold value, and may record "1" in the voting table if the degree of similarity is greater than the predetermined threshold value. For example, if similarity of a face feature $f_0$ of a person A is greater than a threshold value, and may record similarity score of the face feature $f_0$ of the person A as "1".

The processor 140 may determine whether all scores recorded in the voting table are 0 points, and if all the scores recorded in the voting table are 0, may determine that a face identification target is not a face registered in the face database.

If at least one score recorded in the voting table is not 0, the processor 140 may determine whether to assign a weight to the scores recorded in the voting table.

The processor 140 may assign a higher weight to a face feature having a frontal face angle among the face features, may assign a low weight to a face feature if it is blurry, and may assign a higher weight as a difference between the time registered in the face database and a recognition time is smaller.

In assigning weights, the processor 140 may calculate a total score for each user ID by summing scores for each of the N face features for each user ID, and may output a face of a user ID having a highest total score among user IDs as an identification result.

To this end, the processor 140 may include a mask synthesizer 141, a weight-lightener 142, a face detector 143, a preprocessor 144, a face feature extractor 145, and a face identifier 146.

Referring to FIG. 2, the mask synthesizer 141 may synthesize a mask image with face image data held for learning the face feature extraction model of the learning DB 121, and build the mask synthesis learning DB 122 storing the mask synthesized face image.

The weight-lightener 142 may lighten a learning model for extracting a face feature by applying a weight-lightening technique such as pruning or a quantization technique. For example, the weight-lightener 142 may learn a mask wearing face recognition network using a mask wearing face image of the mask synthesis learning DB 122 (1421), may perform network pruning to perform first weight-lightening of the face feature extraction learning model (1422), and may secondly weight the face feature extraction learning model through the quantization technique (1423).

The face detector 143 may receive image data from a camera 210, and may detect a position of the face from the image data. The face detector 143 may detect multiple faces at a same time, and may continuously track areas (positions) of the detected faces to assign face IDs (e.g., the person A or the person B).

The preprocessor 144 may extract a face angle (e.g., roll, pitch, and yaw), and may exclude a face image having a face angle that is greater than a specific threshold value or a threshold range (e.g., a range of roll values, a range of pitch values, and a range of yaw values). The preprocessor 144 may digitize the degree of blur, and may exclude an image with severe blur (e.g., the degree of blur that is greater than a specific threshold value). The preprocessor 144 may extract key points of a face area such that a uniform face can be inputted to the face feature extractor 145, may correct a position of the face, and may align the key points to a constant level.

The face feature extractor 145 may extract face features by using face information aligned in the preprocessor 144 as an input of a learning model for extracting a face feature in the weight-lightener 142.

In some implementations, the face feature extractor 145 may extract a face image inputted from the preprocessor 144 as a feature, and even if a mask is worn or not, it is mapped to a similar feature space, so face identification is possible regardless of whether or not a mask is worn.

The face identifier 146 may receive face features extracted several times from the face feature extractor 145 as an input, and may compare the face features with stored data of the faces of the face DB 123 so as to identify a person's face having a highest degree of similarity.

As such, if the face recognition apparatus 100 is mounted in a robot, if a photograph is taken in a situation where both the robot and a user as a face recognition target, a problem such as partially covering a face of the user may occur, but according to the present disclosure, even if the face is partially covered in video data, a face may be accurately identified through the face feature extractor and a face identifier using the weight-lightened face feature extraction model.

The sensing device 200 may include a camera for photographing a user face.

Figure 3:
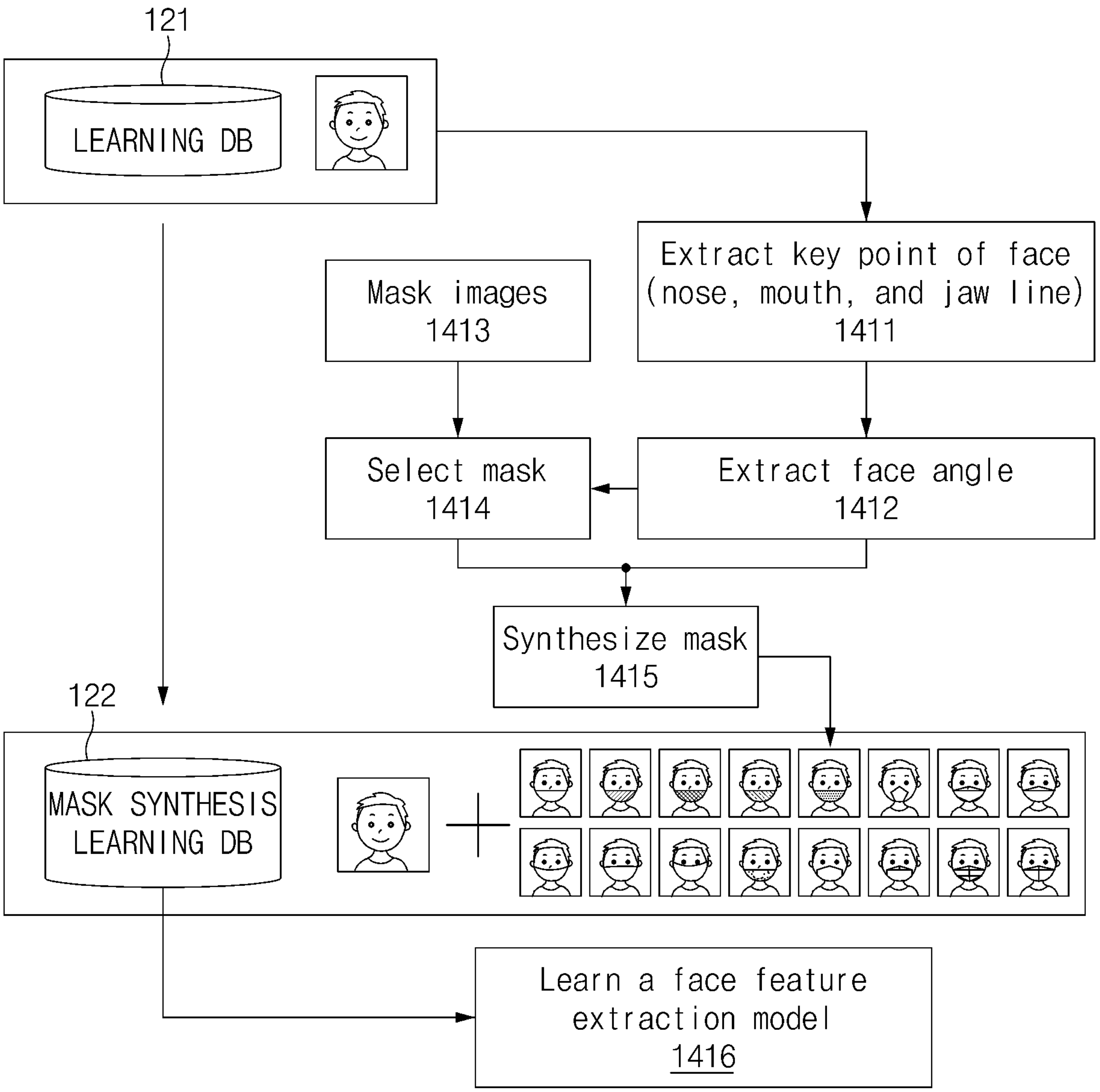
FIG. 3 illustrates an example process of mask synthesis and model learning.
Figure 4:
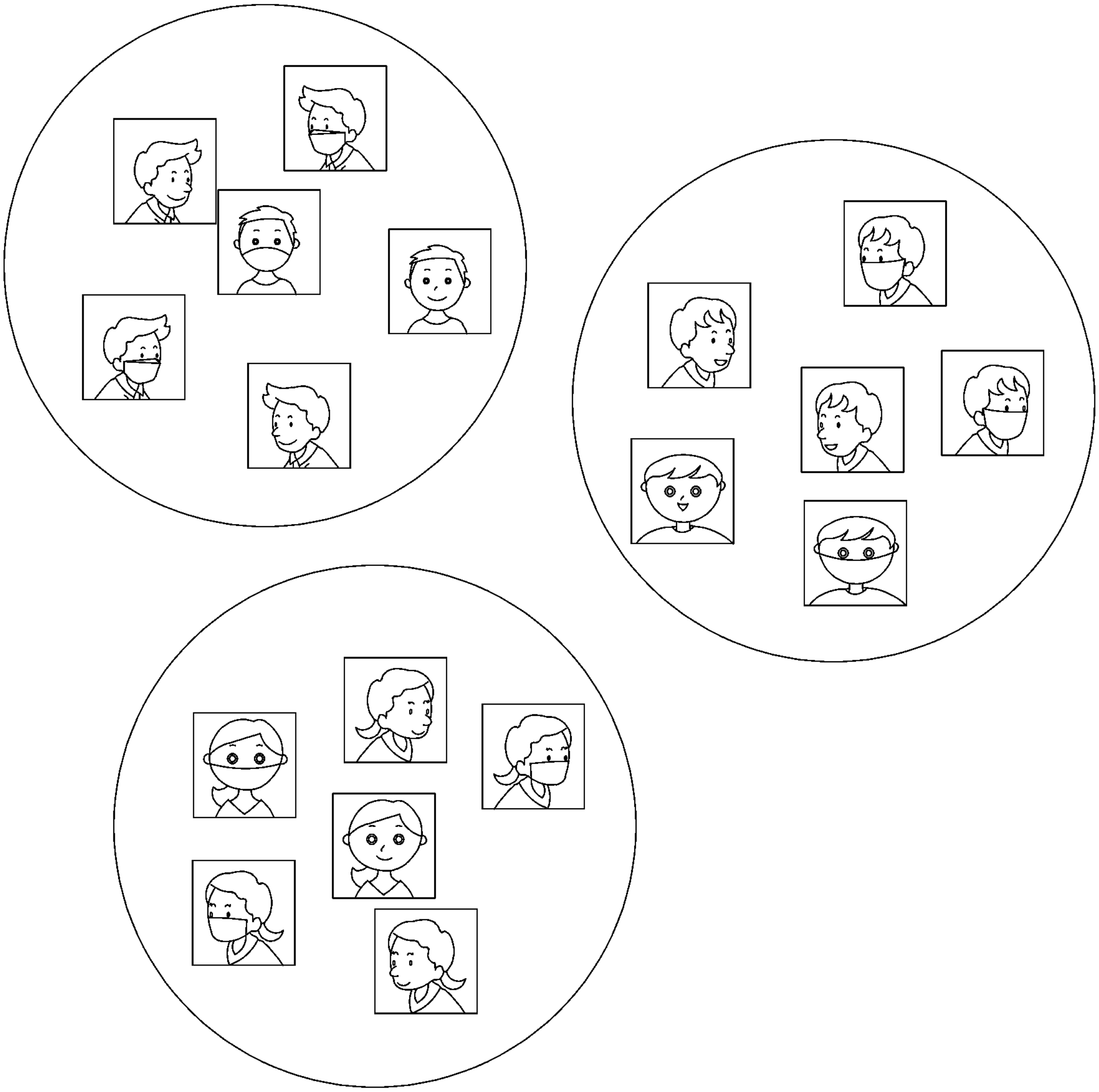
FIG. 4 illustrates an example screen in which a face is mapped to a feature space.
Figure 5:
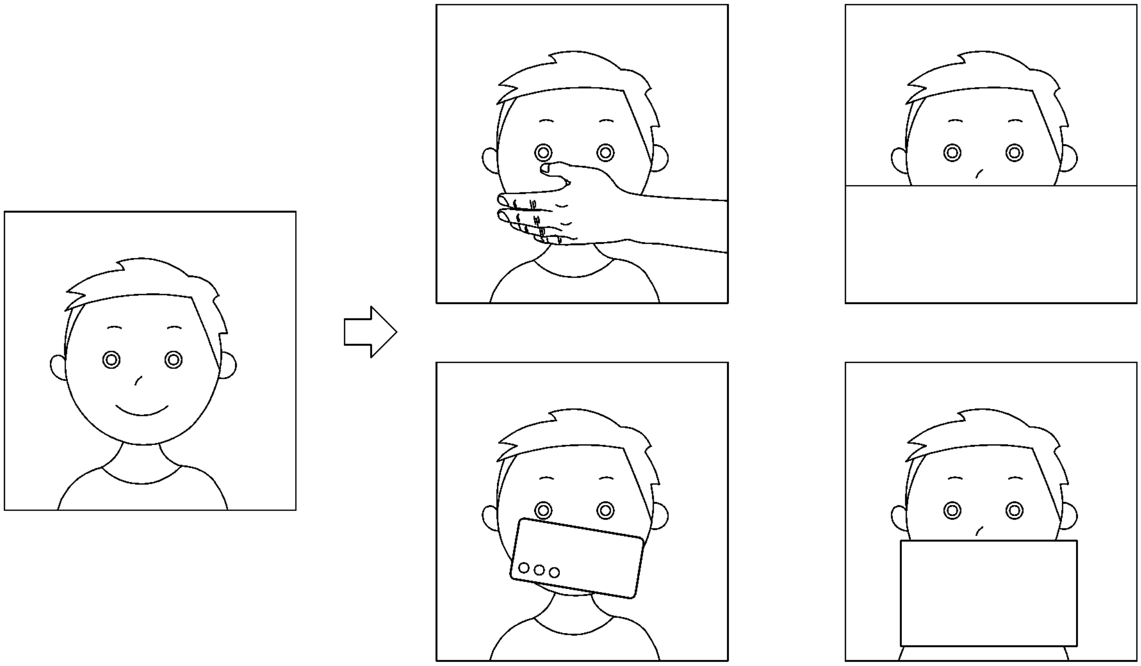
FIG. 5 illustrates an example screen of a deformed synthesis instead of a mask.

FIG. 3 illustrates an example process of mask synthesis and model learning. FIG. 4 illustrates an example screen of a deformed synthesis instead of a mask, and FIG. 5 illustrates an example screen in which a face is mapped to a feature space.

Referring to FIG. 3, the mask synthesizer 141 may extract a key point of a face from the learning DB 121 (1411). The key point of the face may include a nose, a mouth, a jaw line, and the like. The mask synthesizer 141 may extract the face angle based on the key point (1412).

The mask synthesizer 141 may select a mask for synthesis from mask images 1413 (1414).

The mask synthesizer 141 may rotate the selected mask according to an angle of the face, and may synthesize it at a position of the face using a warping process (1415). The mask synthesizer 141 may perform additional synthesis using another object or another pattern (e.g., as illustrated in FIG. 4) other than a mask. The mask synthesizer 141 may generate various mask synthesis images by adjusting a type of mask, a color of the mask, and a type of mask pattern.

The mask synthesizer 141 may form the learning DB 121 and learn a high degree of similarity between a face wearing a mask and a face not wearing a mask for a same person, and map them to a feature space as illustrated in FIG. 5.

The mask synthesizer 141 may learn a face feature extraction model based on mask synthesis image data (1416).

Figure 6:
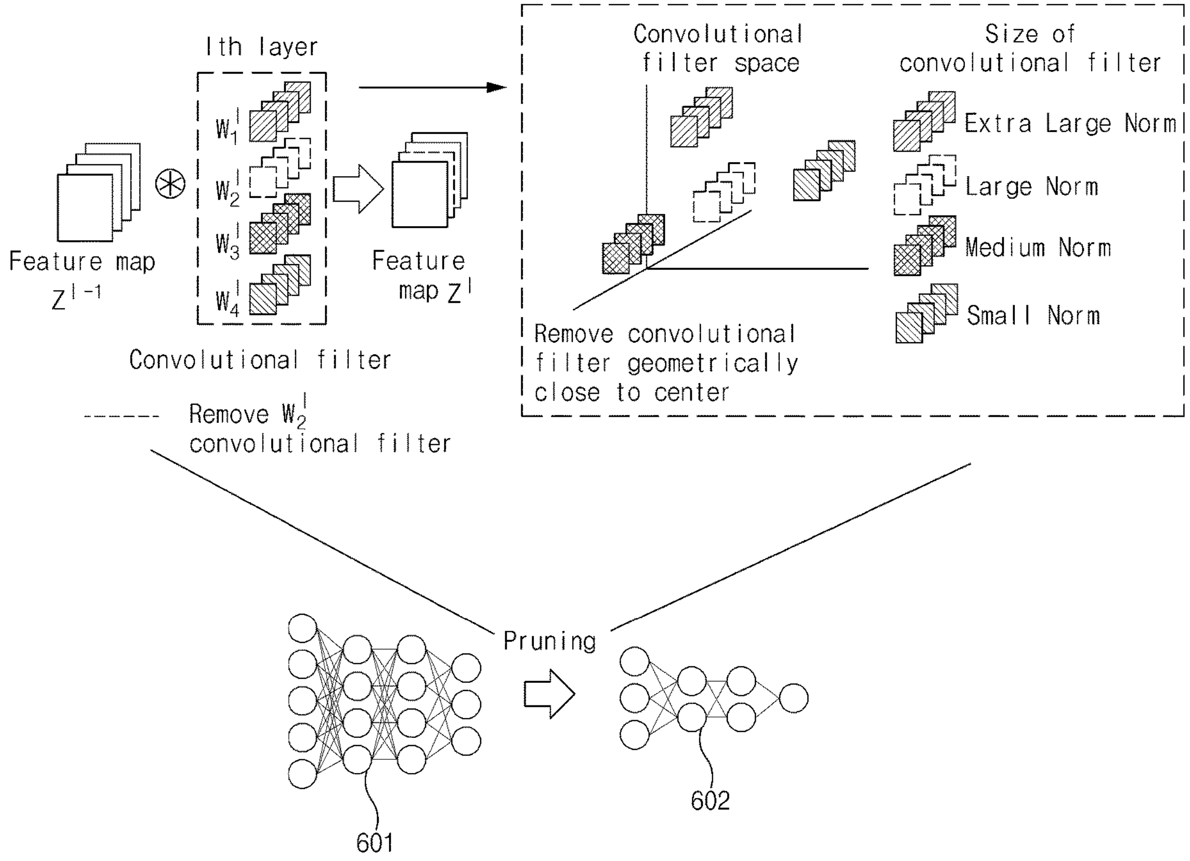
FIG. 6 illustrates a weight-lightening process based on network pruning.

FIG. 6 illustrates a weight-lightening process based on network pruning.

Network pruning may be a method of selecting and removing unnecessary parameters of a model, and a weight-lightened face feature extraction model may be performed by selecting and removing unnecessary parameters of the face feature extraction model learned from mask synthesis data.

As illustrated in FIG. 6, among convolutional filters of each layer of a convolutional neural network, a convolutional filter geometrically close to a center may be removed by applying one of structured pruning techniques to a face recognition deep learning model, which may be the convolutional neural network or any other neural network.

In FIG. 6, an example of removing $W_2$ among the convolutional filters is illustrated.

A face feature extraction model 601 learned in advance by the mask synthesizer 141 may be generated as a face feature extraction model 602 by pruning unnecessary parameters and then re-learning them.

Figure 7:
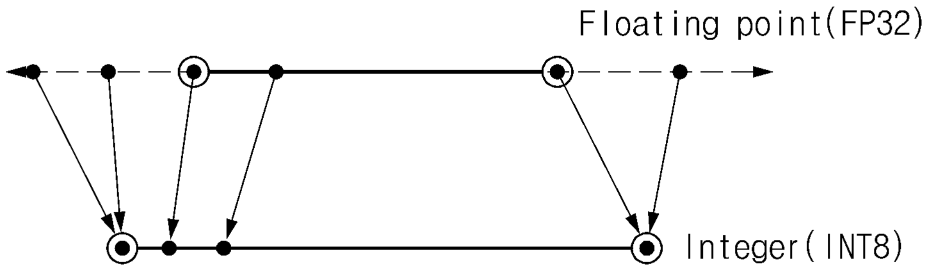
FIG. 7 illustrates an example quantization process for weight-lightening of a prelearned mask wearing recognition model.
Figure 8:
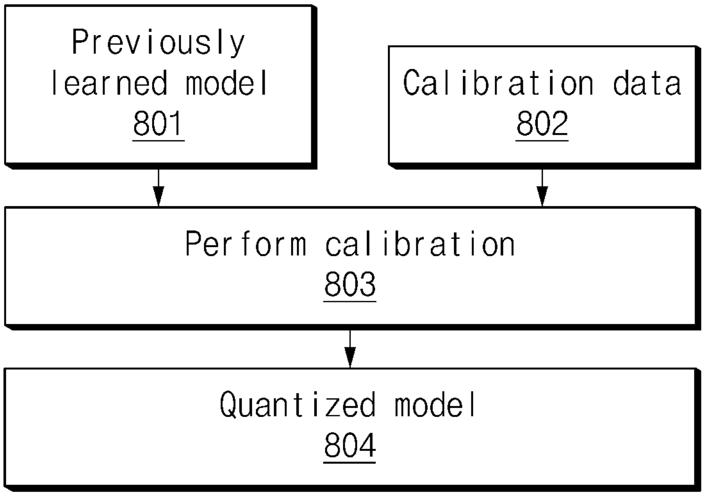
FIG. 8 illustrates a schematic view of an example quantization operation.

FIG. 7 illustrates an example quantization process for weight-lightening of a prelearned mask wearing recognition model, and FIG. 8 illustrates a schematic view of an example quantization operation.

Quantization may be (e.g., additionally) performed in order to further reduce an inference speed of the face feature extraction model 602 and a size of the model by applying network pruning.

The quantization is to convert floating point (e.g., 32 bits) parameters of the face feature extraction model into integer (e.g., 8 bits) parameters as shown in Equation 1 below.

$$Q(r) = \text{int}\left(\frac{r}{s}\right) - z \qquad \text{(Equation 1)}$$

R indicates a real value, S indicates a scaling factor, $$\left(\frac{\beta - \alpha}{2^b - 1}\right),$$

b indicates a quantization bit width (herein, e.g., 8), and Z indicates a value for preventing the quantization value from becoming 0. α and β each indicates clipping range.

In the present disclosure, a technique for performing quantization without additional learning may be used as post training quantization (PTQ). Calibration may be performed using a previously learned face feature extraction model 801 and calibration data 802 separate from the learning data (803), and thus a quantized model may be generated by generating a calibration table and correcting errors generated if weights are quantized using the calibration table (804). In this case, calibration may be to obtain appropriate ranges α and β for converting floating-point weights into integer weights, and to correct the weights of the pre-learned face extraction model accordingly.

FIG. 9 illustrates a view for describing example weight-lightening performance.

Referring to FIG. 9, an inference time and a network size may be significantly decreased as a percentage of pruning increases compared to an existing re-identification model. On the other hand, accuracy may be decreased slightly.

In other words, as a result of applying network pruning and quantization to the face feature extraction model, for performance of the face feature extraction model, compared to an original face feature extraction model without network pruning and quantization, an inference speed may be reduced by up to about 90% and a network size may be reduced by about 93%, while an accuracy drop may be only about 3.9%.

A pruning ratio may be applied in stages of 20%, 40%, 60%, and 80%, and as pruning increases, a size of the model may become smaller and an inference time may decrease, but an accuracy performance may decrease slightly.

In the present disclosure, 80% pruning may be applied, and performance may slightly decrease in a process of weight-lightening the network, but it may be applied without reducing performance in an entire pipeline through convergence with a voting-based identification method. As the performance of the face feature extraction model slightly deteriorates due to network pruning, performance deterioration may be compensated for by extracting the face features several times and using them.

According to the present disclosure, an example of weight-lightening the face feature extraction model using pruning and a quantization method is disclosed, but aspects of the present disclosure are not limited thereto, and the face feature extraction model may be weight-lightened by using various weight-lightening techniques.

Figure 10:
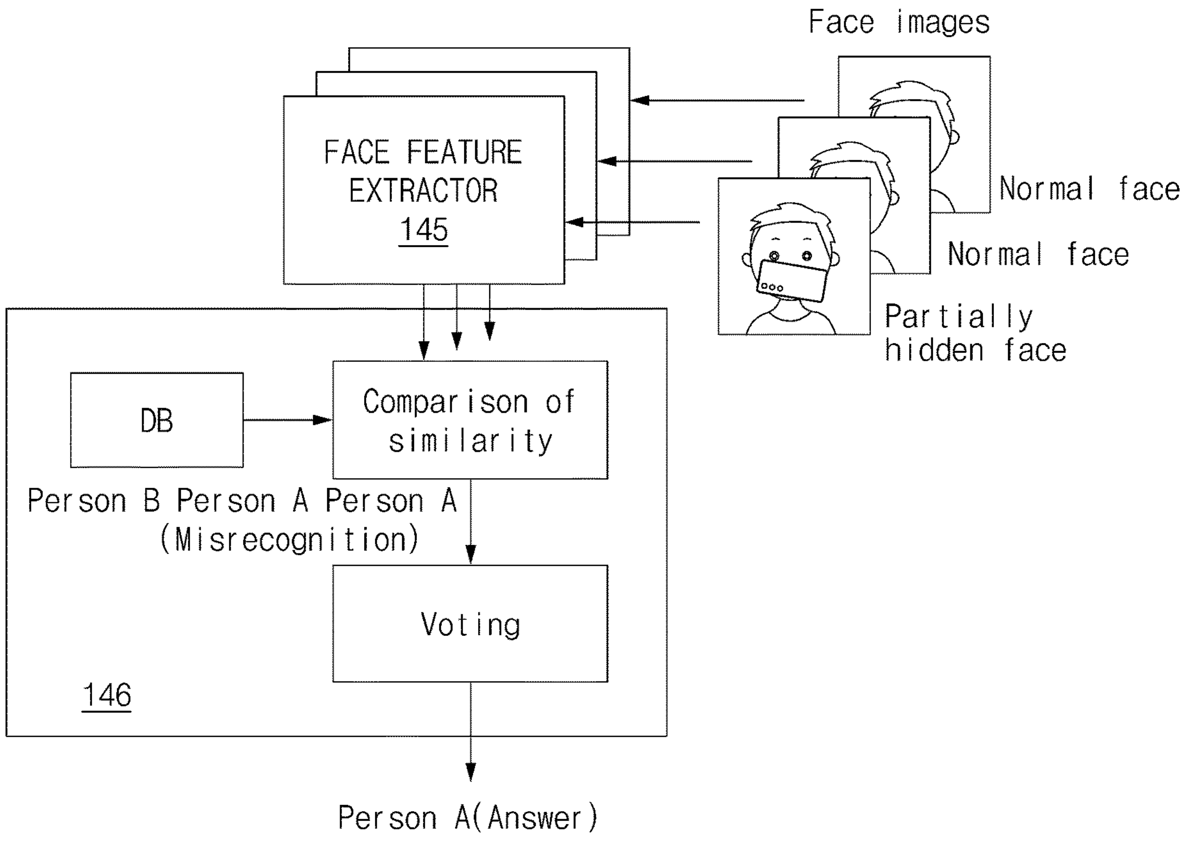
FIG. 10 and FIG. 11 each illustrate an example voting-based face identification process.
Figure 11:
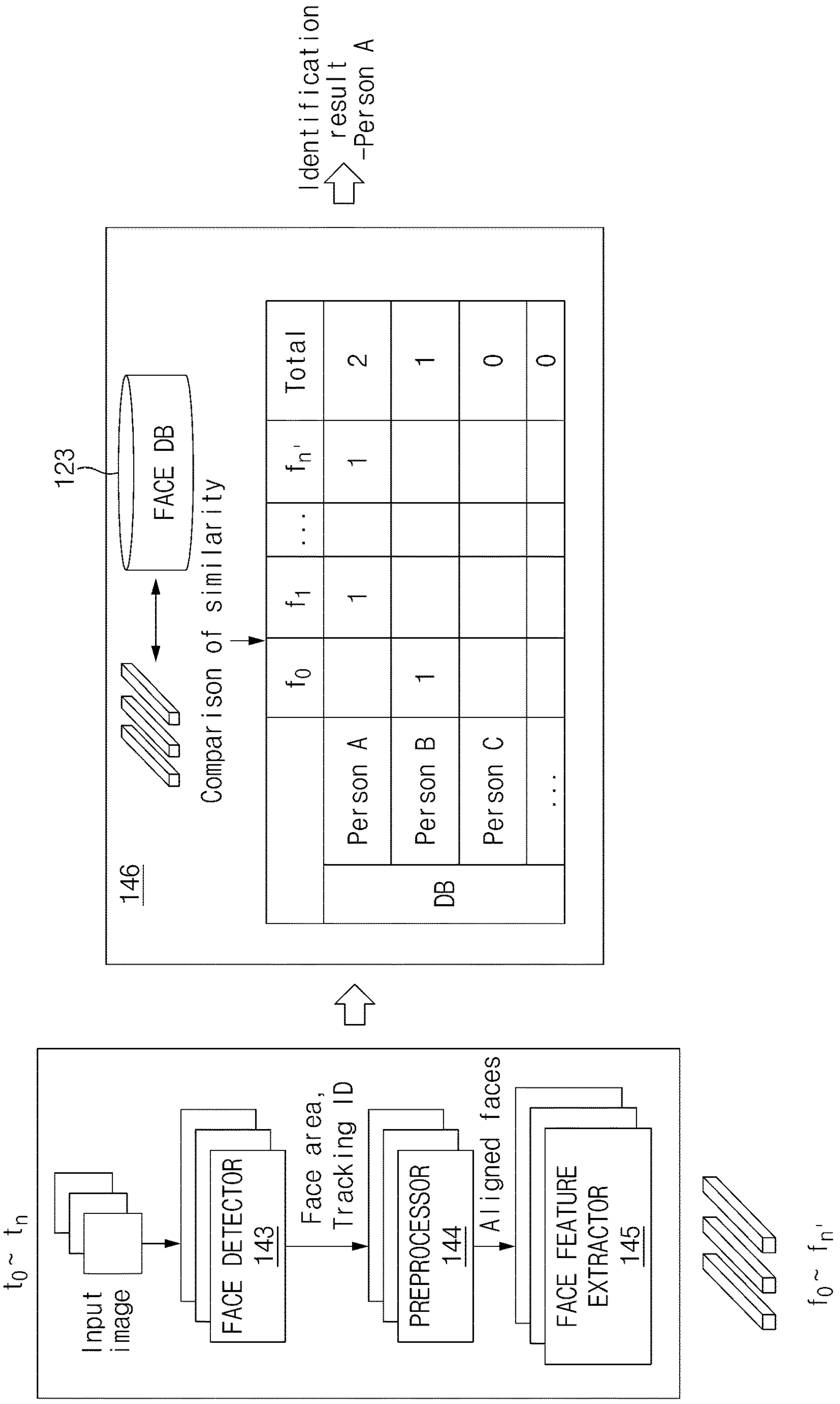

FIG. 10 and FIG. 11 illustrate examples of a voting-based face identification process, and FIG. 12 and FIG. 13 illustrate examples of a voting table.

Even if performance of face recognition model is satisfactory (e.g., a value indicating quality of the performance is greater than a threshold value), if quality of an input image is not satisfactory (e.g., occluded), despite a face having similarity that is greater than a threshold value is identified, misrecognition may occur. If the threshold value is increased, a number of face images excluded by the threshold value may increase, resulting in a situation in which identification is difficult. In a static environment, it may be identified by crossing the threshold value once, but it may not be recognized in a dynamic environment where it must be recognized in an instant.

Accordingly, in the case of a dynamic environment, in a pre-treatment process, a face angle or a degree of blur may be extracted and excluded from a recognition target, but if a face is detected the moment the face is touched with a hand or the face is covered with hair a lot during a real-time service process, it may not be excluded from the pre-treatment process and provided as an input of the face feature extraction module, and thus it may be misrecognized. In addition, if an additional pre-treatment module is provided for this purpose, real-time service may be hindered because the recognition speed is lowered in an edge device environment.

In order to address the above problem, as illustrated in FIG. 10, in the present disclosure, face images may be received and voted several times to enable recognition even if partially hidden face images are provided as inputs.

To this end, face feature extraction may be performed several times, which may reduce the recognition speed, but feature extraction is possible multiple times at the same time because the face feature extraction model is weight-lightened.

The face identifier 146 may perform voting between faces of a same person using a tracking ID (user ID) extracted from the face detector 143.

For example, the face identifier 146 may compare the extracted face features with face features stored in the face DB 123 to calculate similarity, and may determine a face with similarity that is greater than a threshold value and a highest score according to the similarity as an identification result.

Referring to FIG. 11, after the face detector 143 assigns a face area and a tracking ID from an input image and the preprocessor 144 aligns the images of the faces, the face feature extractor 145 may extract face features through the weight-lightened face feature extraction model. In some implementations, the face features may be extracted several times and, the extracted face features ($f_0$~$f_{n'}$) is inputted to the face identifier 146. The face identification apparatus 100 may acquire n face features by repeating a process of image input, face detection, preprocessing, and face feature extraction n times. In this process, n' face features that is equal to or smaller than n may be extracted according to a preprocessing exception condition. In this case, n' may be at least 3, and the face feature extractor 145 may extract at least 3 features, and may extract as many as a number of features that do not interfere with a desired real-time service. The face features of f0 to fn' may include face features of a same person using a tracking ID of the face detector 143.

The face identifier 146 may compare the face features ($f_0$~$f_{n'}$) inputted from the face feature extractor 145 with the face features stored in the face DB 123 to calculate similarity, and if the similarity is greater than a threshold value, the face identifier 146 may store "1" in a voting table.

Scores may be given by determining the similarity of face features for each tracking ID (e.g., person A, person B, person C, etc.), and a tracking ID with a highest score may be outputted as an identification result by comparing a sum of scores for each tracking ID (e.g., person A, person B, person C, etc.).

Referring to FIG. 12, in assigning scores to the voting table, more reliable face identification may be possible by using information known in advance, such as a result of preprocessing, as a weight without an additional process.

For example, a higher weight may be assigned to a frontal face angle, a lower weight may be assigned to a blurry image, and a higher weight may be assigned to images registered more recently (e.g., as a difference between a time registered in the face DB 123 and a recognition time is small (recent information)).

In FIG. 12, total scores of the person A and the person B may respectively become 3.2 and 1.1 by assigning a weight of 0.5 to a feature f1 of the person A, a weight of 0.7 to a feature $f_n$', and a weight of 0.1 to a feature $f_0$ of the person B, thereby outputting the person A as an identification result (e.g., based on the highest score of 3.2 associated with person A).

Referring to FIG. 13, if a sum of each tracking ID in the voting table is equal, a face with a smaller number of scores may be given priority. For example, a larger weight indicates a more reliable face. Alternatively, if information contained in the weight is unreliable, the priority may be reversed. In some example configurations, weights may not be applied. In FIG. 13, the total score of the person A is 3 and the total score of the person B is 3, which are the same. However, since the number of scores for the person A is 2 and the number of scores for the person B is 1, the person B may be output as the identification result.

The weights f1, . . . $f_n$ refer to predefined information about the face image (higher scores when the angle of the face is more frontal, lower scores when the image is blurry).

If the total score is the same but the number of scores is small, it means that the weight is high and the number of scores is low.

In FIG. 13, in the result Person A, the Number is 1+1=2, and the sum of the weights is 0.5+0.5=1.

In the result Person B has a Number of scores of 1 and a Weight of 2.

Here, the reason for finally identifying person B is that person A is less reliable than person B because the total score is the same, but the weight (1) judged as person A is lower than the weight (2) judged as person B.

The face identifier 146 may select an object having a greater sum of similarities if scores and weights are the same.

The face identifier 146 may determine that a person is not registered in the face DB 123 if sums of scores, weights, and similarities are the same.

The face identifier 146 may determine that a person is not registered in the face DB 123 if all scores are 0, that is, if all similarities with faces stored in the face DB 123 do not exceed a threshold value, or if the face DB 123 is empty.

Figure 14:
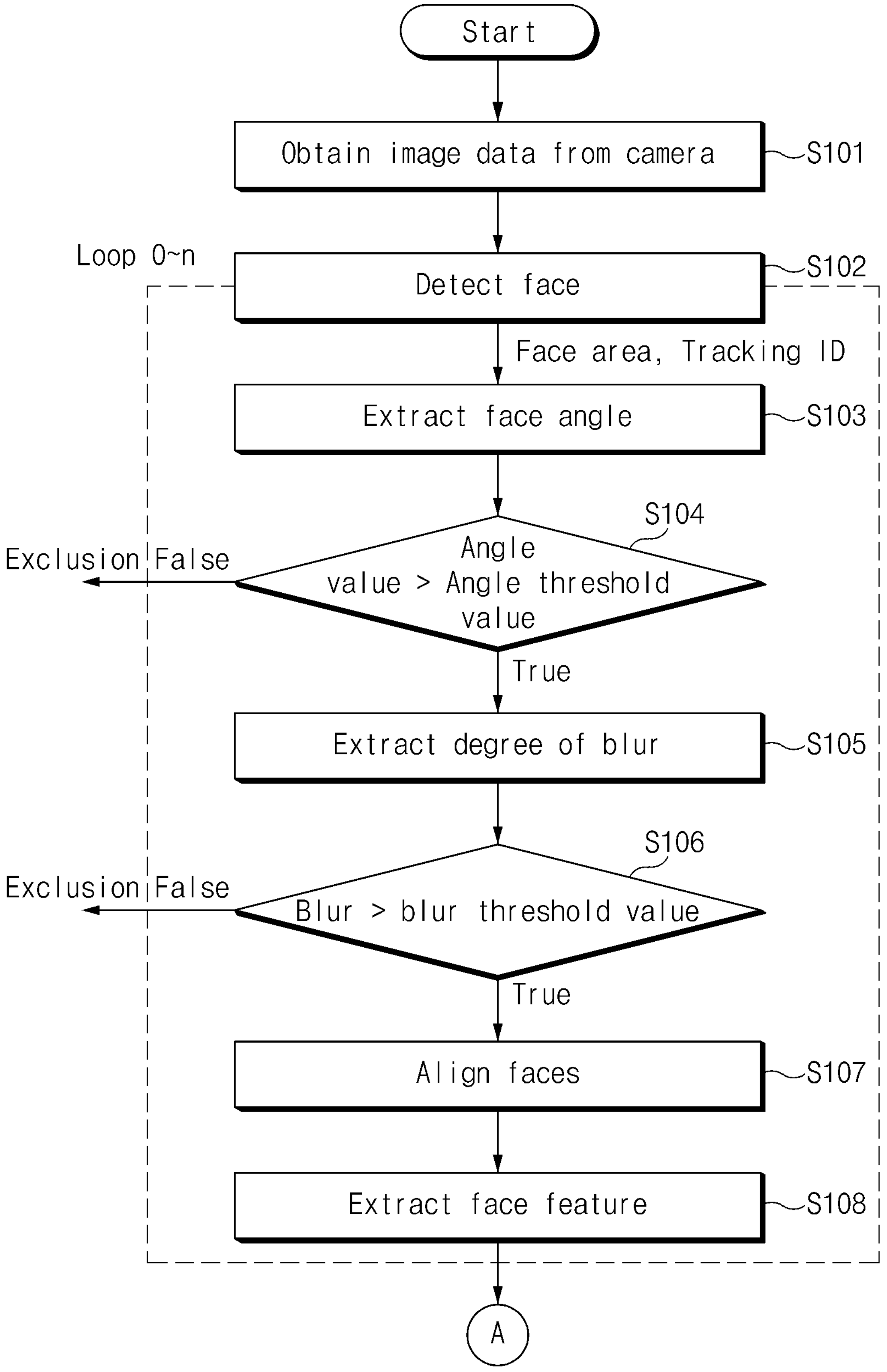
FIG. 14 and FIG. 15 each illustrate a flowchart for describing an example face identification method.
Figure 15:
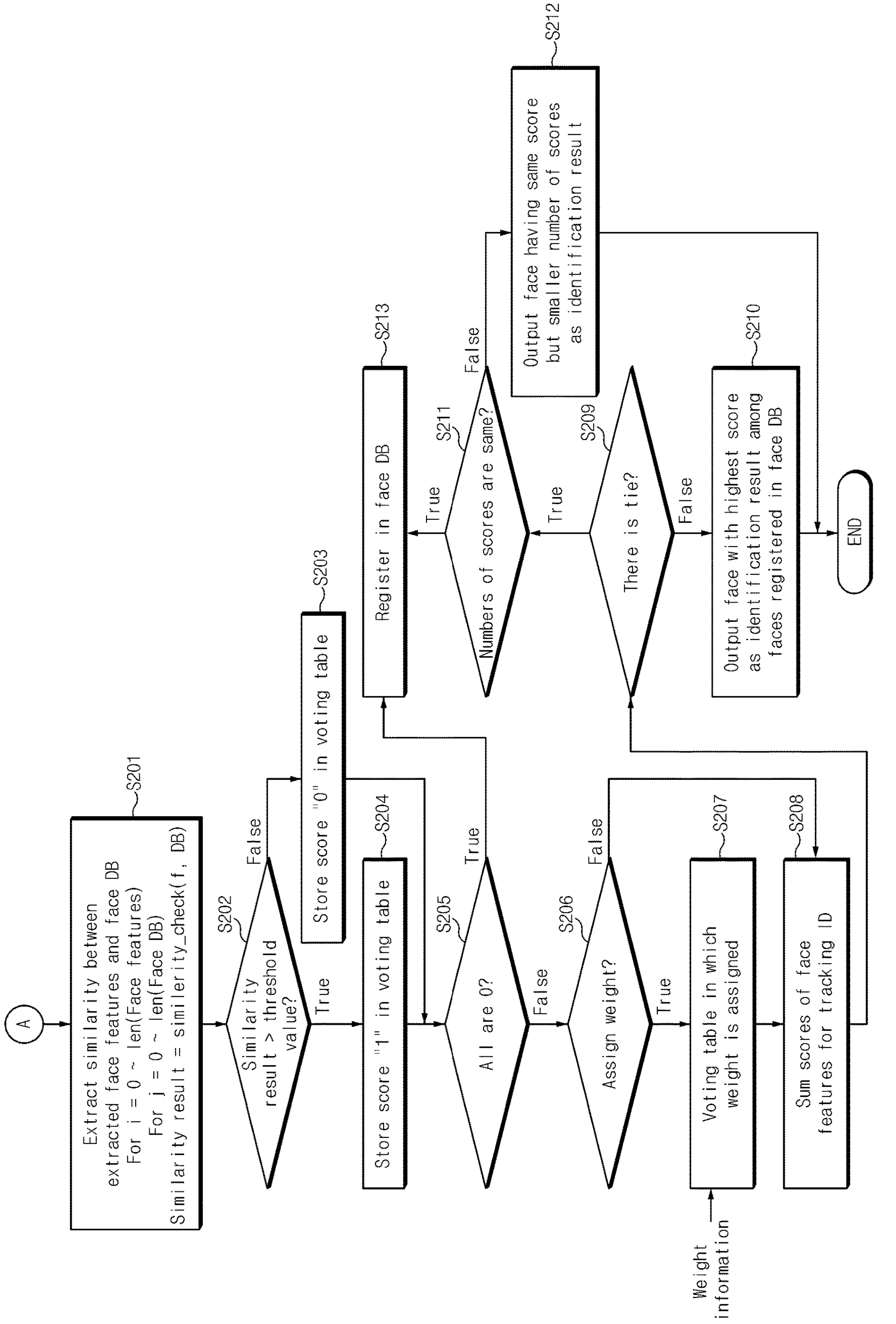

Hereinafter, an example face identification method will be described in detail with reference to FIG. 14 and FIG. 15. FIG. 14 and FIG. 15 illustrate example flowcharts for describing an example face identification method.

Hereinafter, it is assumed that a device (e.g., the face identification apparatus 100 of FIG. 1) performs the processes of FIG. 14 and FIG. 15. In the description of FIG. 14 and FIG. 15, operations described as being performed by the device may be understood as being controlled by the processor 140 of the face identification apparatus 100. The device may be configured in a mobile device, a vehicle, a computing device, etc.

Referring to FIG. 14, the face identification apparatus 100 may obtain image data from the camera 210 (S101). The obtained image data may include an RGB image, a black and white image, etc.

The face identification apparatus 100 may detect a face area from the obtained image data, may track the face area, and may assign a tracking ID (S102).

The face identification apparatus 100 may extract a face angle corresponding to the tracking ID (S103), and may determine whether an angle value is smaller than a predetermined angle threshold value (S104).

The face identification apparatus 100 may exclude (e.g., ignore, discard, etc.) corresponding image data if the angle value is equal to or greater than a predetermined angle threshold value, and may extract a degree of blur of the face image corresponding to the tracking ID if the angle value is less than the predefined angle threshold value (S105).

The face identification apparatus 100 may exclude (e.g., ignore, discard, etc.) the corresponding image data if the blur is equal to or greater than a predetermined blur threshold value, may determine whether the blur is smaller than the predetermined blur threshold value (S106). The face identification apparatus 100 may align the face images if the blur is smaller than the predetermined blur threshold value (S107). For example, the face identification apparatus 100 may align the face to face directly forward (e.g., to the front), based on the face angle. Front-facing face data may be stored in the face DB 123, and thus in comparing face features later, comparison accuracy may be increased in a state where the face is facing directly forward. As such, the face identification apparatus 100 may filter image data based on the angle of the face, the degree of blur, etc., may extract key points of the face area, and may correct (align) a face position.

The face identification apparatus 100 may weight-lighten a face feature extraction model based on a mask synthesized face using pruning and a quantization technique, and may extract face features by using the face data aligned in step S107 as an input of the weight-lightened face feature extraction model (S108).

The face identification apparatus 100 may obtain n face features by performing face feature extraction n times.

Referring to FIG. 15, the face identification apparatus 100 may compare the extracted face features with the face features of the face DB 123 to calculate similarity (S201), for example, after obtaining the face features.

The face identification apparatus 100 may determine whether a similarity calculation result is greater than a predetermined threshold value (S202), and if the similarity calculation result is equal to or smaller than the predetermined threshold value, may store a score as a first value (e.g., “0” or any other value) in the voting table (S203).

On the other hand, if the similarity calculation result is greater than the predetermined threshold value, the score may be stored as a second value (e.g., “1” or any other value) in the voting table (S204).

The face identification apparatus 100 may determine whether all scores stored in the voting table are the first value (e.g., “0”) (S205). If all scores are the first value (e.g., “0”), the face identification apparatus 100 may determine that a face of the image data inputted through the camera 210 is not registered in the face DB 123, and may move to a process for registering it in the face DB 123 (S213).

On the other hand, if all of them are not the first value (e.g., “0”), that is, if at least one second value (e.g., “1”) exists, the face identification apparatus 100 may determine whether to assign a weight to the corresponding score (S206). For example, the face identification apparatus 100 may determine whether to assign a weight by determining a face angle, a degree of blur, and the like. In this case, a higher weight may be assigned to a face image that faces directly forward (e.g., a frontal face angle), a lower weight may be assigned to a blurry image, and/or a higher weight may be assigned for a recently registered image (e.g., as a difference between a time registered in the face DB 123 and a recognition time is small (recent information)).

In assigning weights, the face identification apparatus 100 may reflect the weights in the voting table, and may correct the scores of the voting table (S207).

The face identification apparatus 100 may sum scores of the face features for each face registered in the face DB 123 (S208), and may determine whether there is a tie for each face (S209).

if there is no tie, the face identification apparatus 100 may output a face with a highest score as an identification result (S210).

On the other hand, if there is a tie, the face identification apparatus 100 may determine whether a number of scores for the face features of each face having a same score is the same, and if not, may output a face having the same score but having a smaller number of scores as the identification result (S212).

On the other hand, if both scores and a number of scores of a face are the same, the face identification apparatus 100 may determine that the face of the image data inputted through the camera 210 is a person not registered in the face DB 123 and may register the face in the face DB 123 (S213).

As such, according to the present disclosure, it may be possible to identify a face wearing a mask without additional mask DB configuration or additional module configuration by performing face identification in real time in an edge computing environment through a weight-lightened face feature extraction model and a voting-based face identifier. Accordingly, according to the present disclosure, even a model with very good face recognition performance may identify a face that may be misrecognized (such as a partially hidden face) without misrecognition.

According to the present disclosure, features may be extracted several times in order to perform a voting function, it may be possible to extract face features N times within the same time by lightening the face feature extraction model, and performance of the face identification apparatus may be further improved by performing inference N times using N face features in a voting process. That is, although the performance of the face feature extraction model may be reduced slightly due to weight-lightening, the slight reduction in performance due to the weight-lightening may be offset by allowing the face to be identified through multiple inferences.

The present disclosure may be effective in an edge computing environment where performance is limited, a real-time service environment, and an environment where input images are dynamic.

Although examples of the present disclosure are described with respect to a face identification, it may be applied to other object identification tasks, such as person identification, rather than face identification.

A face identification apparatus may include: a processor configured to detect face information from image data, to extract face features from the detected face information based on a face feature extraction model weight-lightened through a weight-lightening technique, and to compare the face features with a previously stored face database to identify a face according to similarity; and a storage configured to store data and algorithms driven by the processor, and to have the face database.

The processor may be configured to extract a key point of the face from a learning database including learned face image data, and to extract a face angle based on the key point of the face, and to rotate a mask image to match the face angle, and synthesize it.

The processor may be configured to generate a mask synthesis learning database including data obtained by learning a high degree of similarity between a face image wearing a mask and a face image not wearing a mask.

The processor may be configured to perform weight-lightening of the face feature extraction model using network pruning or a quantization technique.

The processor may be configured to detect a face area from the image data, to track the face area, and to assign a tracking ID to the face area.

The processor may be configured to simultaneously detect a plurality of faces from the image data, to track each of the faces, and to assign a tracking ID to each face.

The processor may be configured to extract a face angle for each tracking ID, and if the face angle is equal to or greater than a predetermined threshold value, to exclude image data corresponding to the tracking ID.

The processor may be configured to digitize a degree of blur of the face for each tracking ID, and if the degree of blur is greater than or equal to a predetermined threshold value, to exclude image data corresponding to the tracking ID.

The processor may be configured, if a face angle for each tracking ID is less than a predetermined threshold value by extracting the face angle, and if a degree of blur of the face for each tracking ID is smaller than a predetermined threshold value by digitizing the degree of blur, to align the face for each tracking ID in a uniform direction based on the face angle.

The processor may be configured to extract face features by using the face for each tracking ID aligned in the uniform direction as an input of the weight-lightened face feature extraction model.

The processor may be configured to extract n face features by repeatedly performing a process of extracting the face features detecting face information from the image data, n times.

The processor may be configured to compare the n face features with the face database to calculate similarity, and to determine whether the similarity is greater than a predetermined threshold value.

The processor may be configured, according to a comparison result between the similarity and the predetermined threshold value, to record scores in a voting table in which scores of face features for each user ID are written.

The processor may be configured to record "0" in a voting table in which scores of face features for each user ID are written if the similarity is equal to or less than a predetermined threshold value, and to record "1" in the voting table if the similarity is greater than the predetermined threshold value.

The processor may be configured to determine whether all scores recorded in the voting table are 0 points, and to determine that a face identification target is not a face registered in the face database if all the scores recorded in the voting table are 0.

The processor may be configured, if at least one score recorded in the voting table is not 0, to determine whether to assign a weight to the scores recorded in the voting table.

The processor may be configured to assign a higher weight to a face feature having a frontal face angle among the face features, to assign a low weight to a face feature if it is blurry, and to assign a higher weight as a difference between a time registered in the face database and a recognition time is smaller.

The processor may be configured to calculate a total score for each user ID by summing scores for each of the N face features for each user ID, and to output a face of a user ID having a highest total score among user IDs as an identification result.

The processor may be configured, if there are users ID having total scores that are tied among user IDs, to output, as an identification result, a user ID having a smaller number of scores, which is a number of points to which face features are assigned, among user IDs having a tied score, and to determine that the face identification target is not a face registered in the face database if both the total score and the number of scores are the same.

A face identification method may include: detecting, by a processor, face information from image data; extracting, by the processor, face features from the detected face information based on a face feature extraction model weight-lightened through a weight-lightening technique; and comparing, by the processor, the extracted face features with a previously stored face database to identify a face according to similarity.

Figure 16:
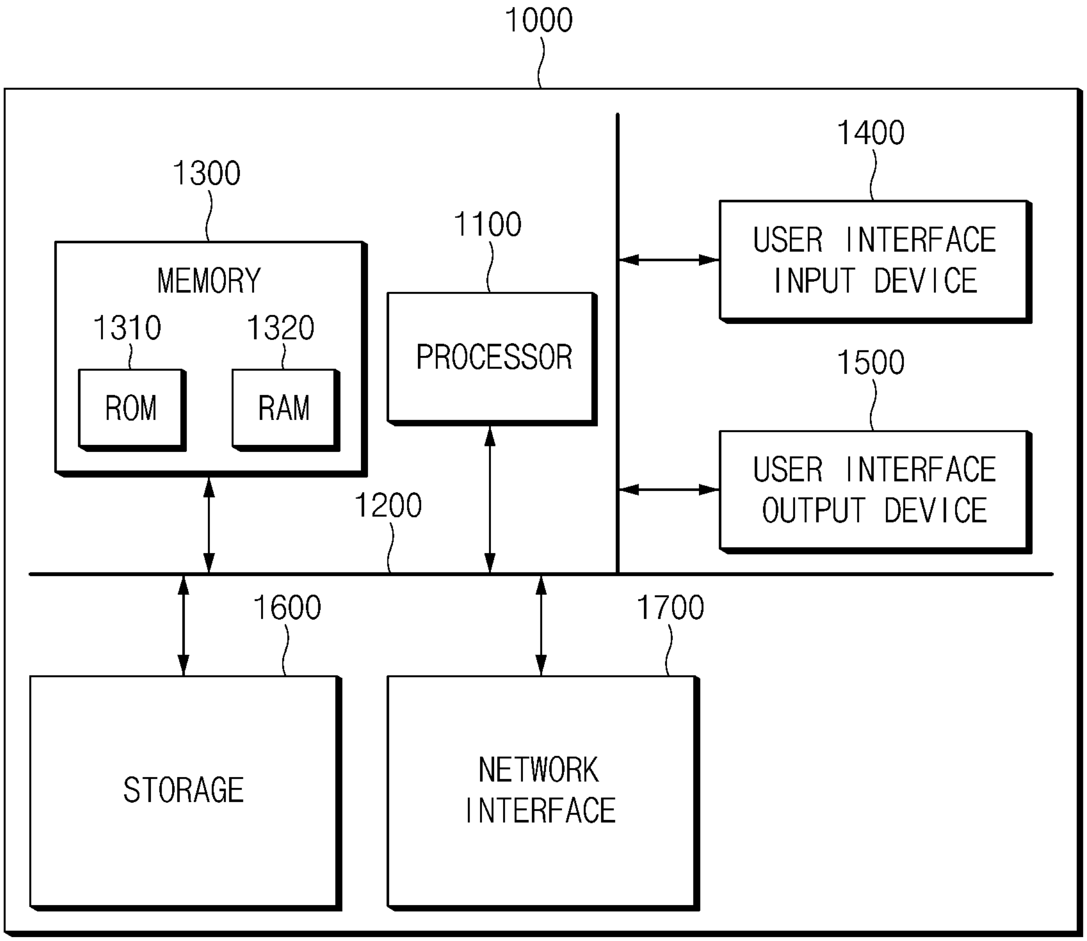
FIG. 16 illustrates an example computing system.

FIG. 16 illustrates an example computing system.

Referring to FIG. 16, the computing system 1000 may include at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the examples disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium.

Alternatively or additionally, the storage medium may be integrated with the processor 1100. The processor and the storage medium may reside within an application specific integrated circuit (ASIC). The ASIC may reside within a user terminal. Alternatively or additionally, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the various examples disclosed in the present disclosure are not intended to limit the technical ideas of the present disclosure, but to explain them, and the scope of the technical ideas of the present disclosure is not limited by these examples described above.

What is claimed is:

1. A face identification apparatus comprising:

an image sensor configured to capture an image of a face of a user and generate image data corresponding to the captured image;

a processor configured to:

detect face information from the image data;

extract face features from the detected face information based on a face feature extraction model weight-lightened through a weight-lightening technique;

compare the face features with face data of a previously stored face database, wherein the face data comprise face features respectively associated with a plurality of user identifiers (IDs);

identify, based on a face similarity result associated with a comparison of the face features and the face data, the face;

determine a total score for each user identifier (ID) based on a sum of scores associated with face features for the respective user ID, wherein the scores are assigned to the respective user ID based on the face similarity result between the extracted face features and the face features associated with the respective user ID stored in the face database; and output, as an identification result, information of a user ID having a highest total score among the user IDs by:

based on at least two user IDs having a same total score, outputting, as the identification result, a user ID having a smaller number of scores among the at least two user IDs; and a storage configured to store data and algorithms executed by the processor, and to have the face database.

2. The face identification apparatus of claim 1, wherein the processor is configured to:

extract a key point of the face from a learning database including learned face image data;

extract a face angle based on the key point of the face; and rotate a mask image to match the face angle.

3. The face identification apparatus of claim 2, wherein the processor is configured to:

generate a mask synthesis learning database including data obtained by learning a degree of similarity between a face image wearing a mask and a face image not wearing a mask.

4. The face identification apparatus of claim 1, wherein the processor is configured to:

perform weight-lightening of the face feature extraction model using network pruning, a quantization technique, or both the network pruning and the quantization technique.

5. The face identification apparatus of claim 1, wherein the processor is configured to:

detect a face area from the image data;

track the face area; and assign a tracking identifier (ID) to the face area.

6. The face identification apparatus of claim 1, wherein the processor is configured to:

detect a plurality of faces from the image data;

track each of the plurality of faces; and assign a tracking identifier (ID) to each of the plurality of faces.

7. The face identification apparatus of claim 5, wherein the processor is configured to:

extract a face angle associated with the tracking ID; and exclude, based on the face angle being equal to or greater than a threshold value, image data associated with the face angle.

8. The face identification apparatus of claim 5, wherein the processor is configured to:

digitize a degree of blur of the face associated with the tracking ID; and exclude, based on the degree of blur being greater than or equal to a threshold value, image data associated with the degree of blur.

9. The face identification apparatus of claim 5, wherein the processor is configured to align, using a face angle associated with the tracking ID, the face associated with the tracking ID in a uniform direction based on:

the face angle associated with the tracking ID being less than a first threshold value; and a degree of blur of the face associated with the tracking ID being less than a second threshold value.

10. The face identification apparatus of claim 9, wherein the processor is configured to:

extract the face features by using the face associated with the tracking ID aligned in the uniform direction as an input of the weight-lightened face feature extraction model.

11. The face identification apparatus of claim 1, wherein the processor is configured to extract the face features by:

repeatedly performing a process of extracting a plurality of face features using the weight-lightened face feature extraction model to determine n face features.

12. The face identification apparatus of claim 11, wherein the processor is configured to:

compare the n face features with the face data of the face database to calculate a face similarity value; and determine whether the face similarity value is greater than a threshold value.

13. The face identification apparatus of claim 12, wherein the processor is configured to:

determine, according to a comparison result between the face similarity value and the threshold value, a score associated with n face features; and record the score in a voting table, wherein the voting table comprises scores associated with face features for at least one user identifier (ID).

14. The face identification apparatus of claim 12, wherein the processor is configured to:

record, based on the face similarity value not satisfying a threshold value, a first value in a voting table comprising scores of face features for at least one user identifier (ID), and record, based on the face similarity value satisfying the threshold value, a second value in the voting table.

15. The face identification apparatus of claim 13, wherein the processor is configured to:

determine whether all scores recorded in the voting table are correspond to a first value, and based on a determination that all scores recorded in the voting table correspond to the first value, determine that a face identification target associated with the detected face information is not a face registered in the face database.

16. The face identification apparatus of claim 15, wherein the processor is configured to:

determine, based on a determination that at least one score recorded in the voting table is greater than the first value, whether to assign a weight to the scores recorded in the voting table.

17. The face identification apparatus of claim 16, wherein the processor is configured to:

assign a higher weight to a face feature having a forward-facing face angle among the face features; and assign a lower weight to a face feature having a degree of blur greater than a threshold value associated with blurriness.

18. A face identification method comprising:

capturing, by an image sensor, an image of a face of a user and generating image data corresponding to the captured image;

detecting, by a processor, face information from the image data;

extracting, by the processor, face features from the detected face information based on a face feature extraction model weight-lightened through a weight-lightening technique;

comparing, by the processor, the extracted face features with face data of a previously stored face database, wherein the face data comprise face features respectively associated with a plurality of user identifiers (IDs);

identifying, based on a face similarity result associated with the comparing, the face;

determining a total score for each user identifier (ID) based on a sum of scores associated with face features for the respective user ID, wherein the scores are assigned to the respective user ID based on the face similarity result between the extracted face features and the face features associated with the respective user ID stored in the face database; and outputting, as an identification result, information of a user ID having a highest total score among the user IDs by:

based on at least two user IDs having a same total score, outputting, as the identification result, a user ID having a smaller number of scores among the at least two user IDs.

19. A face identification method performed by an apparatus, the face identification method comprising:

capturing, by an image sensor, an image of a face of a user and generating image data corresponding to the captured image;

pre-processing, by a processor, the image data by performing an alignment associated with a direction of the face;

detecting face information from the pre-processed image data;

generating a weight-lightened face feature extraction model by:

performing a network pruning on a trained face feature extraction model, and retraining the network-pruned face feature extraction model;

extracting, by the processor, face features from the detected face information by:

inputting, parameters of the detected face information, as an input to the network-pruned face feature extraction model;

comparing, by the processor, the extracted face features with face data of a previously stored face database; and outputting, based on a face similarity result associated with the comparing, a face identification result corresponding to a user identifier (ID) associated with face features stored in the face database.

20. The face identification method of claim 19, wherein the generating of the weight-lightened face feature extraction model further comprises quantizing at least one output parameter of network-pruned face feature extraction model into an integer-based parameter, and wherein the performing of the network pruning on the trained face feature extraction model comprises removing a geometrically-centered convolutional filter among a plurality of convolutional filters.

* * * * *